United States Patent [19]

Gladieux

[11] 4,240,654
[45] Dec. 23, 1980

[54] HOSE END COUPLING UNIT

[75] Inventor: Dennis M. Gladieux, Fort Wayne, Ind.

[73] Assignee: International Harvester Company, Chicago, Ill.

[21] Appl. No.: 79,755

[22] Filed: Sep. 28, 1979

[51] Int. Cl.³ ............................................. F16L 27/00
[52] U.S. Cl. .................................... 285/276; 285/321
[58] Field of Search ...................... 285/321, 276, 307

[56] References Cited

U.S. PATENT DOCUMENTS

| 3,177,018 | 4/1965 | Goodwin | 285/321 X |
| 3,447,819 | 6/1969 | Borsum et al. | 285/321 X |
| 3,731,955 | 5/1973 | Borsum et al. | 285/321 X |
| 3,887,222 | 6/1975 | Hammond | 285/321 X |
| 4,111,464 | 9/1978 | Asano et al. | 285/321 X |
| 4,133,564 | 1/1979 | Sarson et al. | 285/321 |

Primary Examiner—Thomas F. Callaghan
Attorney, Agent, or Firm—Raymond E. Parks; Frederick J. Krubel; F. David AuBuchon

[57] ABSTRACT

A hose end coupling unit which has an expandable interlocking snap ring interconnecting a plug member inside a socket member. The interlocking snap ring has a countersunk or funnel-shaped mounting hole, which fits over a frusto-conical cam surface on the plug member and is expanded thereby, as the plug member is inserted into the socket member, into an internal groove within the socket, and is held in an expanded state confined in the groove, after passing over the cam surface, on a cylindrical shoulder portion on the plug member. A spacer snap ring nested in an external groove in the plug member, outside the socket member, prevents the plug member from being inserted deeper into the socket member once the interlocking snap ring is seated on the shoulder portion. An O-ring seal at the entrance of the socket member seals the interconnected plug and socket members. Removal of the spacer snap ring from the external groove permits withdrawal of the plug member from the socket member by further insertion of the plug member into the socket member to a depth where the interlocking snap ring is forced into a second external groove in the plug, inside the socket, diametrically inwardly of the shoulder portion, and which is of a diameter and of an axial width that allows the interlocking snap ring to contract to the normal unexpanded size within the confines of the second external groove, thereby freeing the interconnecting snap ring from confinement in the internal groove and unlocking the plug from the socket.

8 Claims, 6 Drawing Figures

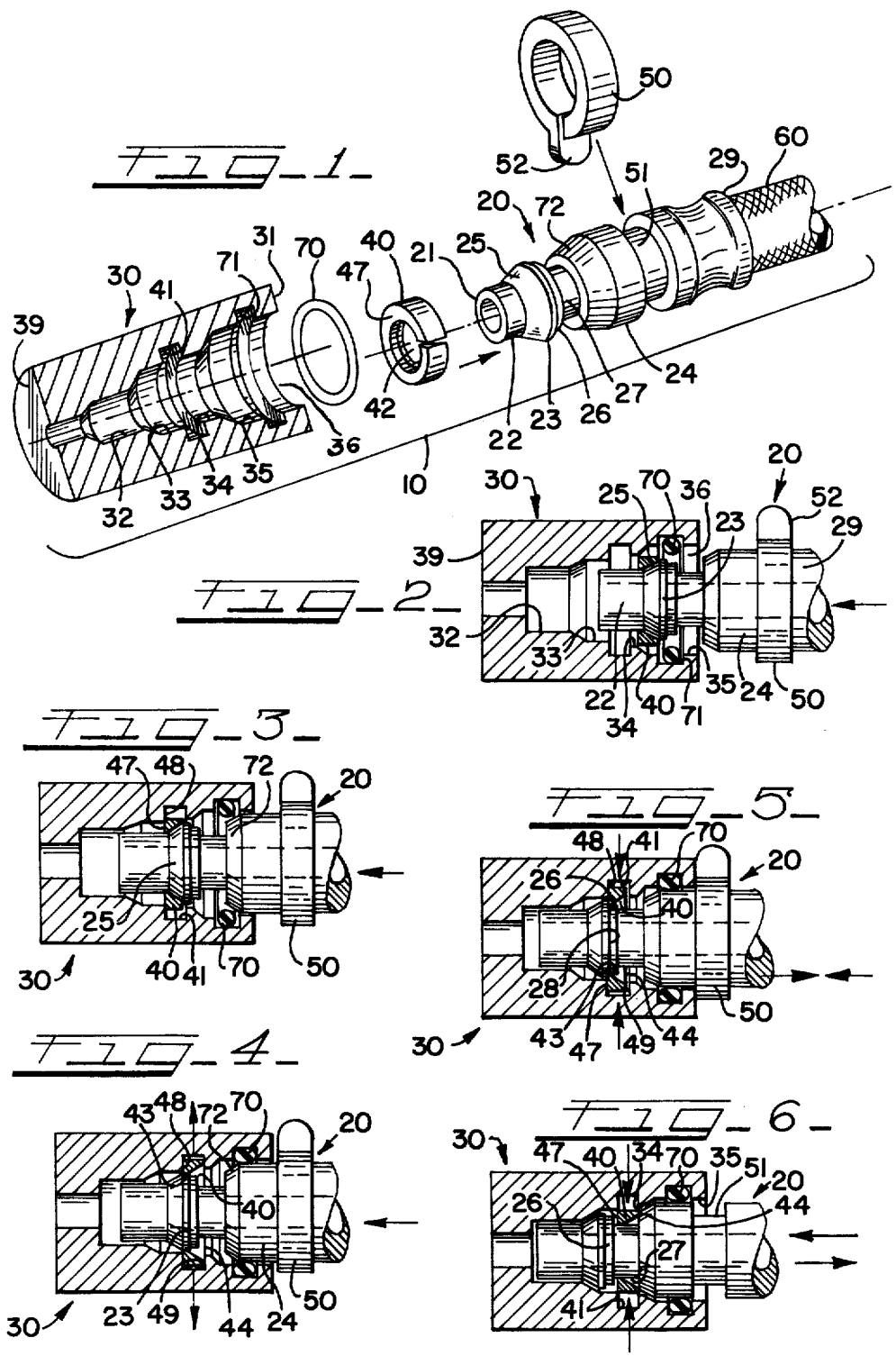

HOSE END COUPLING UNIT

BACKGROUND OF THE INVENTION

This invention relates to a hose end coupling or connector and in particular to a means for interlocking and unlocking a plug and socket hose end coupling unit.

FIELD OF THE INVENTION

In the motor truck industry, push-pull hose end connectors are usually used on front air brake hoses for connecting air brake actuating chambers to frame anchored air fittings. The air hose supplying air to the front brake chamber has a swivel fitting to permit the hose to articulate with the turning of the front wheel. A quick connect and disconnect hose end coupling is an unnecessary expense for use on a front air brake line hose because the hose is seldom disassembled from the chassis. It is only removed whenever a replacement is required.

STATEMENT OF THE PRIOR ART

Present hose end connectors are of the quick connect and disconnect type, such as shown in the U.S. Pat.:
No. 3,177,018—Goodwin—Apr. 6, 1965,
No. 3,447,819—Borsum et. al—June 3, 1969, and
No. 3,731,955—Borsum et. al.—May 8, 1973.

The prior art structures are designed for repeated installation and removal; and are of the push-pull type which have telescopically slideable sleeves that cam interlocking members out of engagement with annular shoulders preparatory to push-pulling the plugs from the socket members. In my invention, I have eliminated the sleeve member and have provided a cam expandable snap ring means and a removable spacer snap ring means for interconnecting the plug and socket, and an O-ring seal for sealing the interconnected plug and socket members. The spacer snap ring is removed preparatory to unlocking the plug from the socket and then push-pulling the plug from the socket member.

SUMMARY OF THE INVENTION

The hose end coupling of my invention comprises a socket member, or female fitting, which has stepped concentric cylindrical bores of diminishing diameters, as the bores extend deeper into the socket fitting, and a plug member, or male fitting, which has stepped cylindrical body portions of increasing diameters, as the tubular plug fitting extends rearwardly toward a hose connecting end. An internal cylindrical groove is provided in the largest size of the stepped bores, which is the opening for accommodating an O-ring seal. A chamfered surface merges the opening bore with a smaller diameter bore that forms an outermost shoulder with another internal cylindrical groove. The second internal groove separates this bore from a bore of even lesser diameter and forms an innermost shoulder therewith. The innermost and outermost shoulders accommodate an interconnecting snap ring means therebetween, which has a conical or funnel shaped opening. Another chamfered surface merges the bore of even lesser diameter with the smallest size bores which accommodates the smallest cylindrical body portion of the plug and contains a discharge opening.

The smallest size cylindrical body portion is the leading or pilot portion of the tubular plug and has a diameter of a size to carry the interconnecting split ring means thereon in the relaxed or unexpanded state. A frusto-conical shaped cam surface flaring axially outwardly and rearwardly toward the hose connecting end of the plug, merges the pilot portion with a larger diameter cylindrical body portion, which is of slip fit size past the innermost shoulder and with the bore of even lesser diameter in the socket, and forms a cylindrical cam dwell portion. The frusto-conical cam surface compliments and cooperates with the funnel shaped opening in the interconnecting split ring means sleeved over the pilot portion. The outside diameter of the interconnecting split ring means, in the relaxed or unexpanded state, is less than the internal diameters of the bore opening, the bore of smaller diameter and the outermost shoulder respectively, and is greater than the internal diameters of the innermost shoulder and the bore of even lesser diameter, so that it cannot slip past the innermost shoulder into the bore of even lesser diameter, as the pilot portion axially passes into the smallest size bore or the exhaust chamber, thus positioning the circular innermost and outermost sides of the interconnecting snap ring means, respectively, between the innermost and outermost shoulders of the second mentioned internal cylindrical groove. As the pilot portion enters into the exhaust chamber, the innermost flat circular side of the interconnecting split ring means sleeved thereon, which has the small opening of the funnel shaped hole, abuts against the innermost shoulder; and is expanded by the frusto-conical cam surface; and is cammed radially outwardly into the depths of the second mentioned internal cylindrical groove; and is moved axially rearwardly onto the cylindrical cam dwell portion of the plug. The trailing end of the dwell portion has a cylindrical turned down step forming a stop and a seat for the expanded interconnecting snap ring means snapped thereon. The radial outwardly shoulder formed by the step prevents the expanded interconnecting snap ring means from returning to the pilot portion and the cylindrical bottom of the step is of a diameter to support and hold the interconnecting snap ring means in the expanded state within the confines of the second mentioned internal cylindrical groove and is of an axial width to support the narrow edge around the small end opening of the funnel shaped hole in the interconnecting snap ring means. An external cylindrical groove is provided on the plug diametrically inwardly of the stepped edge and is of a diameter and axial width to support and contain the interconnecting snap ring means therein in the relaxed, contracted or unexpanded state.

As the pilot portion is pushed deeper into the exhaust chamber, the wide innermost circular side of the interconnecting snap ring means continues to abut the innermost shoulder of the second mentioned internal groove so that the narrow circular lip edge of the interconnecting snap ring means is pushed along the cam dwell portion and snapped onto the trailing stepped end thereof.

A beveled surface is provided around the leading edge of the largest of the cylindrical body portions, which guides the O-ring seal, in the first mentioned internal cylindrical groove, into sealing engagement thereon. The O-ring seal, when rolled on the largest cylindrical body portion, seals the largest bore or socket opening.

A second external cylindrical groove is provided on the plug in a location outside of the socket, which accommodates and seats a spacer snap ring means therein. The spacer snap ring means abuts against the outside of the socket around the socket opening and limits the insertion of the plug in the socket to the point where the interconnecting snap ring means snaps onto the trailing turned down edge, or stepped end of the cam dwell portion, and is confined in the second mentioned internal cylindrical groove.

To release the plug, the spacer snap ring means is removed from the second mentioned external cylindrical groove and the plug is pushed deeper into the socket to the point where the interconnecting snap ring means is pushed off of the turned down edge or stepped end and into and within the confines of the first mentioned external cylindrical groove, which has a diameter equal to the pilot portion. Since the interconnecting snap ring means is now in the relaxed, contracted or unexpanded state, the outside diameter is of a size that the outermost circular rim, formed by the large open end side of the funnel shaped hole in the interconnecting snap ring means, is diametrically inwardly of the outermost shoulder and it now can be pulled rearwardly out through the smaller diameter and largest diameter bores, respectively.

In order to provide a frictionless swivel bearing contact surface with the socket fitting, the spacer snap ring means may be made of a plastic material.

BRIEF DESCRIPTION OF THE DRAWING

FIG. 1 is an exploded perspective view of a hose end coupling unit in accordance with the teachings of the invention;

FIGS. 2-4 inclusive each illustrate various positions of the plug member being inserted into the socket member, and the interaction of the interconnecting and sealing parts;

FIG. 5 shows the interconnected position of the plug and socket members; and

FIG. 6 illustrates the unlocked position, or the push-pull position, for the removal of the plug member from the socket member after the spacer snap ring means is removed from the outer external groove in the plug member.

DESCRIPTION OF THE PREFERRED EMBODIMENT

With reference to FIG. 1, the hose end coupling unit 10 comprises a male body member or plug fitting 20 and a female body member or socket fitting 30. A hose 60 is shown connected to the trailing or rearward end 29 of the plug member or fitting 20, which normally protrudes from the socket member or fitting 30. The socket fitting 30 may be supported by a motor truck chassis (not shown) and the discharge port side 39 may be connected to the front wheel air brake actuating chambers (not shown).

The plug fitting 20 is tubular and has three stepped cylindrical body portions 22, 23 and 24 increasing in diameter from the front or leading end side 21 towards the rearward or trailing hose end side 29, and the socket fitting 30 has four concentric bores or openings 32, 33, 34 and 35, three of which 32, 33 and 35 are of slip fit size with the three body portions 22, 23 and 24, decreasing in inside cylindrical size from the front or opening end side 31 rearwardly toward the discharge port side 39.

An interconnecting split ring means 40, which has a funnel or conical shaped mounting hole 42, is slidably mounted in a relaxed, contracted or unexpanded state, on the pilot portion 22, which is the smallest of the three cylindrical body portions, and a split spacer ring means 50 is mounted or confined in an external cylindrical groove 51 on the trailing end side 29 of the plug 20 on the outside of the socket 30 shown in FIG. 2. The split spacer ring means 50 has a radially projecting tab portion 52 which facilitates it's removal from the confining external cylindrical groove 51. The spacer snap ring means 50 may be made of a plastic material in order to provide a frictionless bearing surface when abutting or in contact with the rim 31 around the opening 36 in the socket 30.

An O-ring seal 70 is shown in FIG. 2 carried in an internal cylindrical O-ring groove 71 in the largest bore, of the socket opening 36.

A frusto-conical transitional or cam surface 25 merges the pilot portion 22 with a cylindrical cam dwell portion 23, which is of slip fit size past the innermost shoulder 48 of interlocking groove 41 and is of an axial width less than the thickness of the interlocking snap ring means 40, but greater than the narrow inner lip rim portion 43 within the small hole side of the funnel shaped hole 42 in the expanded interconnecting snap ring means 40. As shown in FIG. 2, the interconnecting snap ring means 40 is sleeved over the pilot portion 22 and the flaring surface of the funnel shaped mounting hole 42 is abutted against the flaring frusto-conical cam surface 25 prior to the insertion of the plug fitting 20 into the socket opening bore 36.

The trailing end of the dwell portion 23 has a diametrically inwardly stepped edge 26 forming a shoulder means 28. The radial outwardly extending shoulder means 28 as shown in FIG. 5, forms a stop against which the radially inwardly portion of the flat circular side 47 of the interlocking snap ring means 40 abuts and is prevented from returning to the pilot portion 22. The axial width of the shoulder means 28 is greater than the narrow inner lip portion 43 within the small hole opening side 47 of the funnel shaped hole 42 and the cylindrical bottom is of a diametrical size to prevent the interconnecting snap ring means 40 from contracting out of the confines of the internal interlocking groove 41. A spacer split ring means 50 seated in an external groove 51 in the plug 20, on the outside of the socket 30, prevents the further insertion of the plug fitting 20 into the socket fitting 30, so that the radially outwardly portion of the flat circular side 47, of the interconnecting snap ring means 40, abuts against the innermost shoulder 48 of the internal interlocking groove 41, and the outermost shoulder 49, which is an abutting axial alignment with the narrow circular side or rim portion 44 around the large hole end, of the funnel-shaped hole 42, of the interlocking snap ring means 40, prevents the withdrawal of the plug fitting 20 thereby interlocking the plug and socket fittings 20 and 30.

Diametrically inwardly of the shoulder means 26 is another external cylindrical groove 27 in the plug member 20, which has an axial width sufficient to confine the broad and narrow circular flat sides 47 and 44, of the interconnecting snap ring means 40, and which has a diameter equal to the pilot portion 22 to allow the interconnecting snap ring means 40 to contract back to its normal unexpanded size out of confinement with the internal interlocking groove 41 and diametrically inwardly of the outermost shoulder 49, as shown in FIG. 6, thereby unlocking the plug fitting 20 from the socket fitting 30.

A chamfered O-ring seal guide surface 72 is provided on the leading edge of the largest of the stepped cylindrical portions, the O-ring seal engaging portion 24, to guide the O-ring seal 70 thereon, see FIGS. 3 and 4. The socket fitting 30, as mentioned previously, has four concentric stepped bores 32, 33, 34 and 35 decreasing in diameter from the front end 31 toward the rear discharge port end 39. Three of the bores, namely 35, 33 and 32 are of a slip fit size, respectively with the pilot portion 22, the dwell portion 23 and the O-ring seal engaging portion 24. The penultimate innermost bore 34 is of a diameter which permits passing of the interlocking split ring means 40 therethrough when it is sleeved over the pilot portion 22 and when it is confined within the second interlocking ring means support groove 27. Each of the slip fit bores 35, 33 and 32 has an axial length which will permit the plug 20 to be inserted deeper into the socket fitting 30, upon removal of the spacer ring 50 as shown in FIG. 6, in order to unseat the interlocking snap ring means 40 from the cam dwell portion step or shoulder means 26 by pushing it against the innermost shoulder 48 of the internal interlocking groove 41 snapping it into the interlocking means supporting, confining and contracting groove 27.

MODE OF OPERATION

The male portion, or plug fitting 20, is inserted in the usual manner in the female portion, or socket fitting 30, until a resistance is felt upon the interlocking snap ring means 40 contacting the innermost shoulder 48 of the groove 41. A sharp thrust will transfer or cam the interlocking split ring means 40 over the frusto-conical cam surface 25 expanding it over the dwell portion 23 and into the interlocking groove 41, FIG. 4, and then snapping it onto the turned-down shoulder means 26, FIG. 5, thereby interlocking both the male and female portions together; and simultaneously sleeving the O-ring seal 70 over the largest cylindrical portion 24 and sealing the largest bore 35 and the opening 36; and simultaneously abutting the spacer snap ring means 50 against the socket bore rim 31 around the opening 36 in the socket member 30. The plug and socket members 20 and 30 are now interlocked and sealed, but free to rotate relative to each other on their common axis on the plastic bearing surface of the spacer snap ring means 50.

To disassemble or unlock the plug and socket members 20 and 30, the plastic spacer split ring means 50 is removed from the groove 51 by tab portion 52 and the plug fitting 20 is pushed deeper into the socket fitting 30 so that the innermost shoulder 48, which abuts against the radially outwardly portion of the flat circular side 47 of the interlocking snap ring means 40, unseats the radially inwardly portion from the cam dwell portion shoulder means 26 and pushes it into the supporting, confining and contracting groove 27, wherein the interlocking split ring means 40 contracts to a normal unexpanded state within the axial confines of the external groove 27 and out of confinement with the interlocking internal groove 41 and radially inwardly of the outermost shoulder 49. The plug fitting 20 can now be withdrawn as the outside diameter of the interlocking split ring means 40 can pass through the outermost shoulder 49 and the bores 34 and 35.

What is claimed is:
1. A hose end coupling unit, comprising:
a plug member having a leading cylindrical pilot portion end;
a socket member having axially spaced apart first and second cylindrical internal grooves around a cylindrical bore means for receiving the plug member, the first internal groove forming axially spaced innermost and outermost shoulders of different diametrical size with two bores of the bore means having different internal diameters;
an expandable interconnecting snap ring means sleeved over the pilot portion end of the plug member in an unexpanded state;
a flaring cam means including a cylindrical cam dwell portion at the enlarged flared end of the cam means on the plug member for expanding the interconnecting snap ring means into the first internal groove between the innermost and outermost shoulders, the outermost shoulder and the respective one bore having a circular opening of a size axially admitting the interconnecting snap ring means sleeved on the pilot portion end of the plug member and the innermost shoulder and the respective second bore having a circular opening of a size axially admitting the cam means and the cam dwell portion and barring the interconnecting snap ring means on the pilot portion end thereby forcing the interconnecting snap ring means to slideably expand over the cam means and into the first internal groove and slide onto the cam dwell portion upon continued axial movement of the cam means deeper into the second bore;
the cam dwell portion having a trailing diametrically inwardly stepped cylindrical edge portion forming a radially outwardly extending shoulder means for preventing the expanded interconnecting snap ring means from returning to the pilot portion end after sliding over the cam dwell portion and snapping onto the shoulder means, the cylindrical bottom of the shoulder means of a diametrical size holding the interconnecting snap ring means thereon in the expanded state in the first internal groove between the innermost and outermost shoulders;
the plug member having first and second external cylindrical grooves, the first external groove located adjacent the shoulder means and diametrically inwardly thereof and having an axial width and cylindrical size sufficient for confining and permitting the interconnecting snap ring means to contract therein to the unexpanded state upon further axial movement of the cam means deeper into the second bore whereby the innermost shoulder barring the interconnecting snap ring means and forcing it off of the shoulder means and into the first external groove thereby unlocking the plug member from the socket member and permitting withdrawing the plug member from the socket member;
a removable spacer snap ring means carried in the second external groove in the plug member located outside of the interlocked plug and socket members for locking the plug member against the further axial movement of the cam means deeper into the second bore thereby preventing the forcing of the interconnecting snap ring means off of the shoulder means and into the first external groove;
means for removing the spacer snap ring means from the second external groove preparatory to pushpulling the plug member out of the socket member; and
an O-ring seal carried in the second internal groove sealingly engaging a trailing cylindrical end portion of the plug member and sealing the bore means.

2. A hose end coupling unit according to claim 1, wherein the interconnecting snap ring means has a funnel shaped mounting hole, and the cam means is flared into a frusto-conical surface nesting the interconnecting snap ring means thereon in the unexpanded state.

3. A hose end coupling unit according to claim 1, wherein the trailing end portion starts adjacent the first internal groove and is provided with a bevel edge facilitating sleeving of the O-ring seal thereon.

4. A hose end coupling unit according to claim 1, wherein means for removing the spacer snap ring means comprise a radially outwardly extending tab on the spacer snap ring means.

5. A hose end coupling unit according to claim 1, wherein the spacer snap ring means is made of a plastic bearing material to permit swivelling of the interconnected plug and socket members.

6. A hose end coupling unit according to claim 1, wherein the cylindrical size of the first external groove in the plug member is equal to the cylindrical size of the pilot portion end, and the trailing end portion is diametrically larger than the cam dwell portion.

7. A hose end coupling unit, according to claim 2, wherein the axial width of the cam dwell portion and the axial width of the shoulder means are each less than the thickness of the interconnecting snap ring means and greater than the thickness of a circular lip inside the small end opening of the funnel shaped hole therein.

8. A hose end coupling unit according to claim 2, wherein a circular edge around the large end opening of the funnel shaped hole in the interconnecting snap ring means axially contacts the outermost shoulder in the expanded state of the interconnecting snap ring means.

* * * * *